Figure 1:
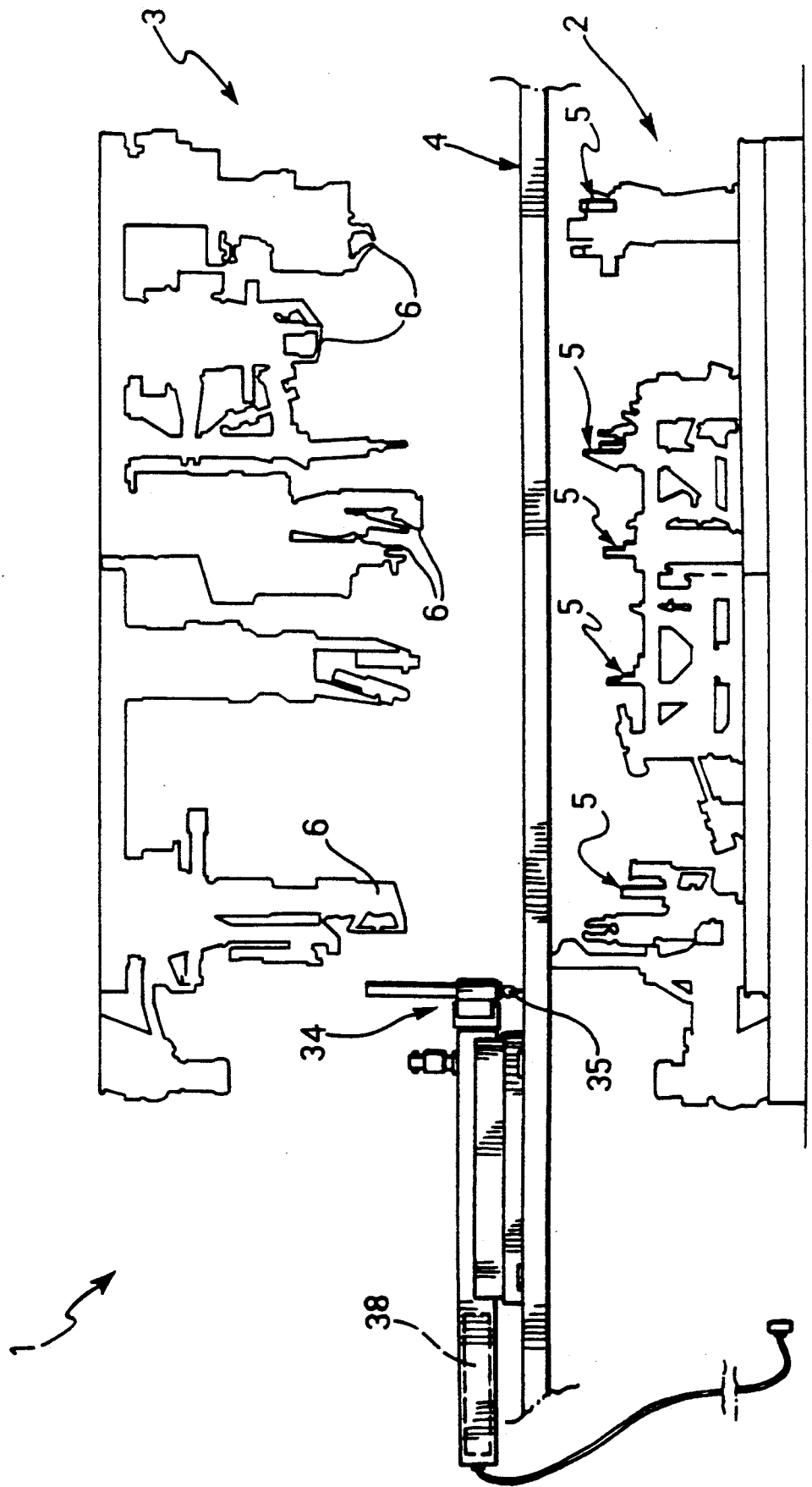

United States Patent [19]

Alborante

[11] Patent Number: 5,159,844
[45] Date of Patent: Nov. 3, 1992

[54] METHOD AND A DEVICE FOR CHECKING FIXTURES USED IN MACHINES OR STATIONS IN PRODUCTION LINES OR INSTALLATIONS

[75] Inventor: Giancarlo Alborante, Trofarello, Italy

[73] Assignee: Comau SPA, Torino, Italy

[21] Appl. No.: 689,588

[22] Filed: Apr. 19, 1991

[30] Foreign Application Priority Data

Apr. 20, 1990 [IT] Italy ................ 67297 A/90

[51] Int. Cl.[5] ................ G01B 5/20; G01M 19/00
[52] U.S. Cl. ................ 73/865.9; 33/551
[58] Field of Search ................ 33/553, 554, 545, 551, 33/559; 73/865.8, 865.9

[56] References Cited

U.S. PATENT DOCUMENTS

| 3,136,069 | 6/1964 | Reason | 33/554 |
| 4,166,323 | 9/1979 | Maag | 33/551 |
| 4,601,109 | 7/1986 | Klingler et al. | 33/553 |
| 4,677,755 | 7/1987 | Iwano et al. | 33/503 |

FOREIGN PATENT DOCUMENTS

| 358003 | 3/1990 | European Pat. Off. | |
| 3345936 | 6/1985 | Fed. Rep. of Germany . | |
| 2505717 | 11/1982 | France . | |
| 58-218641 | 12/1983 | Japan . | |
| 60-173407 | 9/1985 | Japan . | |
| 61-105413 | 5/1986 | Japan . | |
| 61-114121 | 5/1986 | Japan . | |
| 64-87141 | 3/1989 | Japan . | |
| 1-164543 | 6/1989 | Japan . | |
| 0152753 | 6/1990 | Japan | 33/553 |
| 354313 | 6/1961 | Switzerland . | |
| 2167862 | 6/1986 | United Kingdom | 33/545 |
| 2197478 | 5/1988 | United Kingdom | 33/554 |
| 2221062 | 1/1990 | United Kingdom . | |

OTHER PUBLICATIONS

Machines Production, No. 458, 9th Feb. 1987, pp. 49–52, Boulogne, FR; JA. Bosch: "Mesure par coordonnees: systeme flexible pour ateliers de fabrication flexible".

Werkstatt Und Betrieb, vol. 121, No. 10, Oct. 1988, pp. 821–822, Munich, DE; H. Ellenberger: "Werkstattaugliche Koordinaten-Messtechnik".

Primary Examiner—Hezron E. Williams
Assistant Examiner—George M. Dombroske
Attorney, Agent, or Firm—Sughrue Mion Zinn Macpeak & Seas

[57] ABSTRACT

The positioning and/or configuration of the fixtures used in the various machines or stations of a production line are checked by an automatic checking device including a coordinate-checking unit which moves automatically along the line and stops at each machine or station in order to carry out the necessary checks. A stationary electronic control unit near each machine or station is connected to electronically-controlled actuator means on the checking unit in order to control the movement of a feeler head of the checking unit according to a predetermined program adapted to the specific station at which the checking unit has stopped.

3 Claims, 3 Drawing Sheets

METHOD AND A DEVICE FOR CHECKING FIXTURES USED IN MACHINES OR STATIONS IN PRODUCTION LINES OR INSTALLATIONS

DESCRIPTION

The present invention relates to a method and a device for checking the arrangement and/or configurations of fixtures used in machines or stations in production installations such as, for example, lines for welding pressed sheet-metal structures, lines for assembling mechanical parts, lines for carrying out mechanical operations, and the like.

In installations of the type indicated above, each machine or station of the installation has a plurality of fixtures—whose positions are adjustable for supporting and/or locating the parts to be worked and these define the correct positions of the parts during the operation. The displacement of one or more fixtures from their correct positions results in the production of defective products. For example, in a station for the assembly of a pressed sheet-metal structure such as, for example, a motor-vehicle body by electrical spot-welding, the displacement of one or more locating fixtures from their correct positions may result in a body being output from the station with parts which are deformed from their intended configuration.

Currently, when a situation of the type described above occurs, the production line has to be stopped and one or more operators must intervene to check the correct positioning of all the fixtures of the welding station in order to identify the fixture or fixtures which are wrongly positioned and to take action to eliminate the error. This operation is lengthy and also laborious because it may be difficult for the operator to gain access to the various fixtures.

In order to prevent the aforesaid problems, the subject of the present invention is a method for checking the fixtures used in machines or stations in production installations such as, for example, lines for welding pressed sheet-metal structures, lines for assembling mechanical parts, lines for carrying out mechanical operations, and the like, characterised in that it comprises the following steps:

a) providing at least one coordinate-checking unit comprising:
a support structure,
at least one feeler head carried by the support structure and movable relative thereto so that it can travel along any path in space, and
electronically-controlled actuator means carried by the support structure for controlling the movement of the feeler head, b) providing a stationary electronic unit near each machine or station for controlling the actuator means on the coordinate-checking unit in order to move the feeler head according to a predetermined program adapted to the specific arrangement and configuration of the fixtures of that machine or station, c) moving the checking unit along the installation, stopping it successively in correspondence with the various machines or stations whose fixtures are to be checked, at least for the time necessary to carry out the checks, d) connecting the actuator means of the checking unit to the stationary control unit after the checking unit has stopped at each specific machine or station so that the coordinates of the fixtures can then be checked according to the corresponding predetermined program, e) disconnecting the stationary control unit from the actuator means of the checking unit—after the checks have been carried out at a specific machine or station—to enable the unit to be moved to the next machine or station, f) displaying the results of the checks by means of the stationary control unit near each machine or station in order to identify any fixtures which are displaced from their correct positions and to determine the extent of any displacement.

A further subject of the invention is the checking device which enables the aforesaid method to be carried out.

The device according to the invention is characterised in that it comprises:

a) at least one coordinate-checking unit including a support structure, at least one feeler head carried by the support structure and movable relative thereto so that it can travel along any path in space, and electronically-controlled actuator means carried by the support structure for controlling the movement of the feeler head, b) a stationary electronic unit near each machine or station of the installation for controlling the actuator means on the coordinate-checking unit in order to move the feeler head according to a predetermined program adapted to the specific arrangement and configuration of the fixtures of each machine or station, c) means for moving the checking unit along the installation, stopping it successively in correspondence with the various machines or stations whose fixtures are to be checked, at least for the time necessary to carry out the checks, d) means for connecting the actuator means of the checking unit to the stationary control unit located in correspondence with each specific machine or station so as to enable the coordinates of the fixtures to be checked according to a predetermined program, and e) display means forming part of the stationary control unit for displaying the results of the checks in order to identify any fixtures which are displaced from their correct positions and to determine the extent of any displacement.

In practice, the checking unit may take the form of a robot which is moved periodically along the line in order to check that all the fixtures are correctly positioned. Clearly, the means for moving the robot along the line may be formed according to any known technique. Once the checking robot has stopped at a specific station, it is connected to the local control unit which instructs it on the operations to be carried out in that specific station in order to check the fixtures thereof. Upon completion of the check, the results are displayed, for example, on a video screen and/or as a print-out, so as to enable rapid correction.

Figure 2:
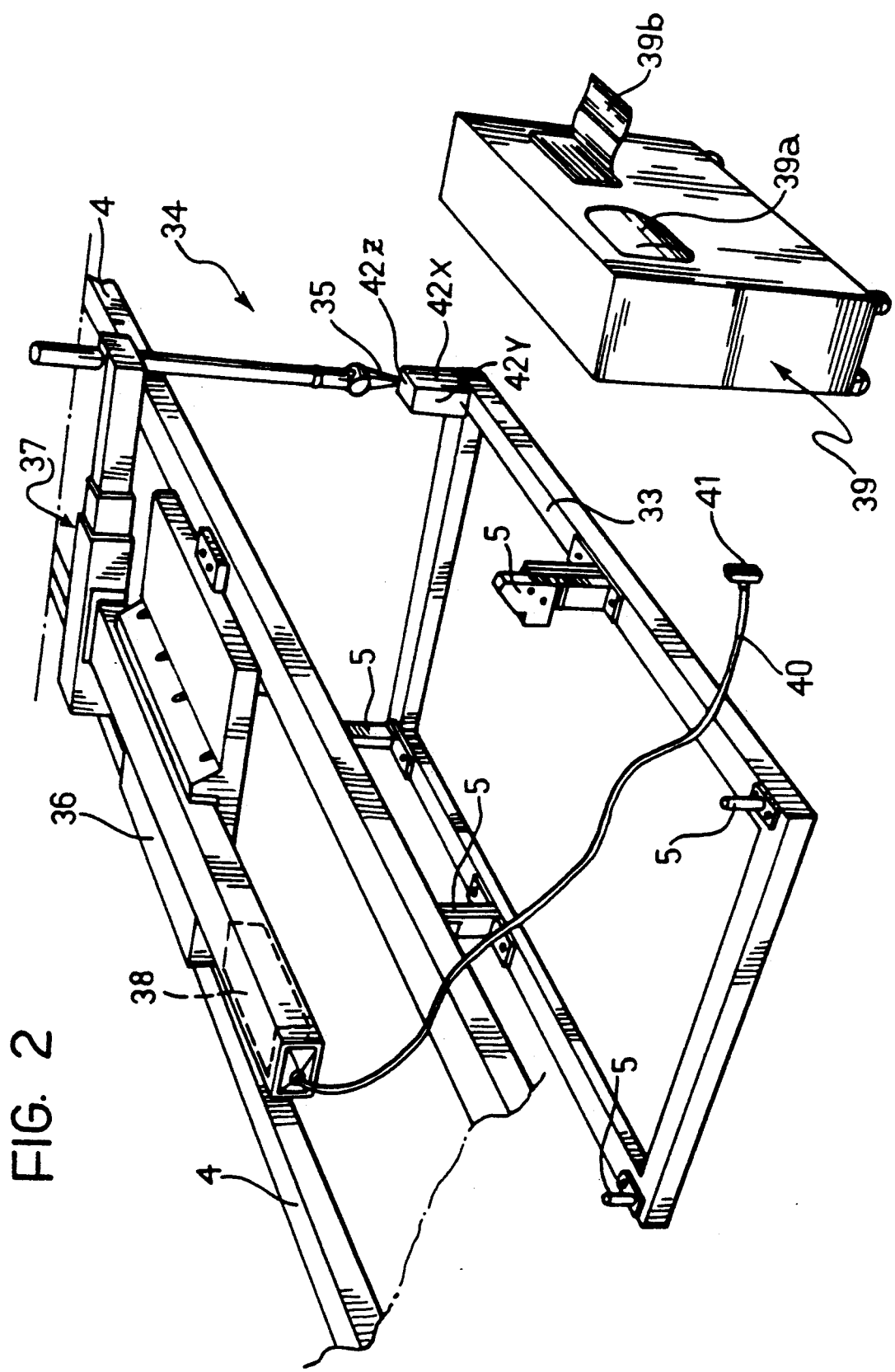
Figure 3:
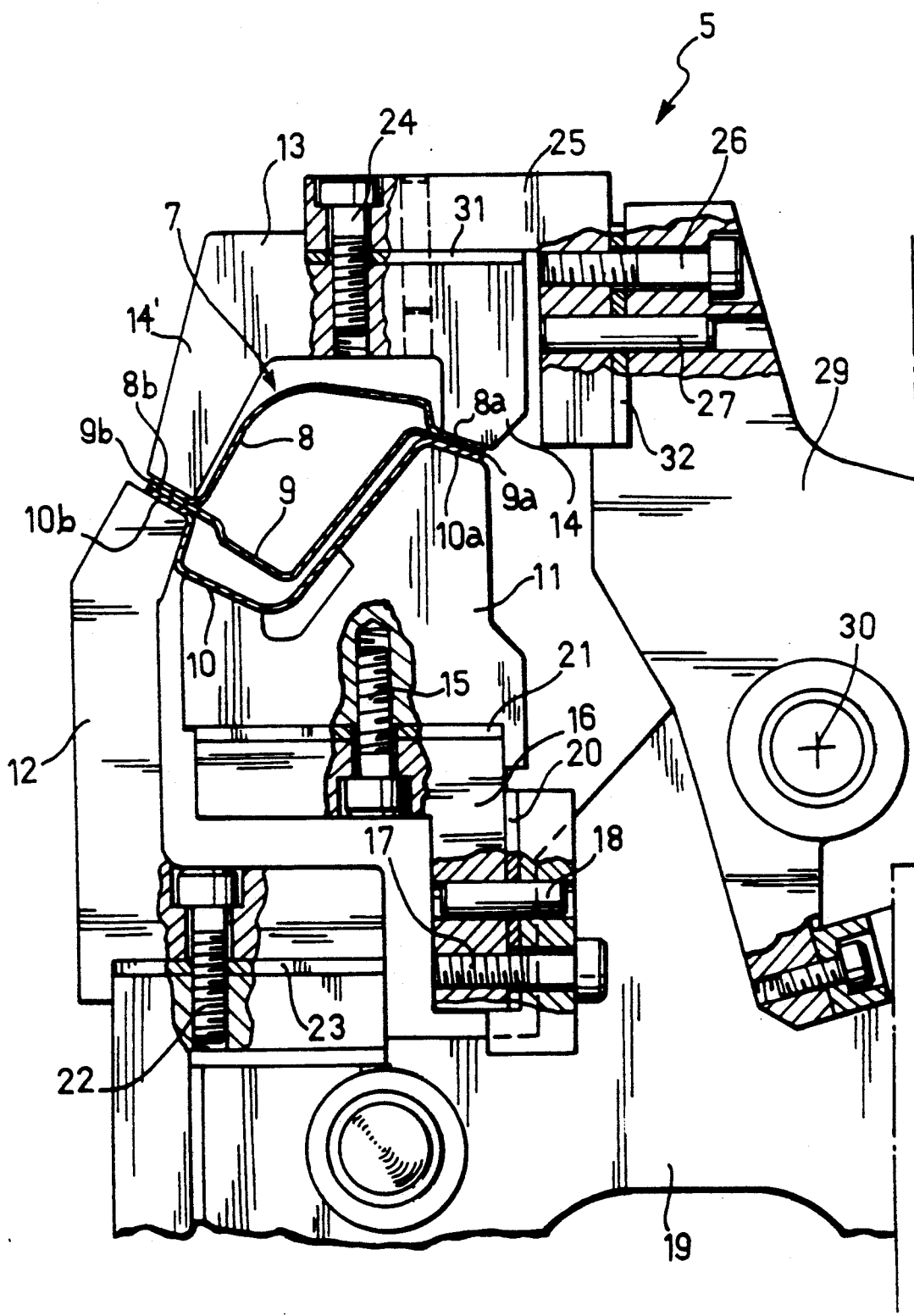

Further characteristics and advantages of the invention will become clear from the description which follows with reference to the appended drawings, provided purely by way of non-limiting example, in which:

FIG. 1 is a schematic side view of a machine for the electrical spot-welding of the pressed sheet-metal floor of a motor vehicle, FIG. 2 is a perspective view showing the basic principle of the method of the invention, and FIG. 3 is a partially-sectioned view of a fixture forming part of a welding station which can make use of the device of the invention.

FIG. 1 illustrates an example in which the method of the invention is applied to an assembly line for welding together motor-vehicle floors made of pressed sheet-metal parts. Typically, a line of this type includes welding machines of the type shown in FIG. 1. The structure of this kind of machine is well known in the art and, as it stands, does not fall within the scope of the present invention. For this reason, the structural details of the machine shown in FIG. 1 are not provided in the present description. A brief indication of the general configuration of the machine will be given below, however, to facilitate an understanding of the invention under discussion.

FIG. 1 shows a machine for the electrical spot-welding of a motor-vehicle floor made of pressed sheet-metal parts. The machine, generally indicated 1, includes a lower unit 2 which is intended to receive a floor to be welded and an upper unit 3 which is movable vertically relative to the lower unit 2 between a raised position (shown in FIG. 1) which enables a structure to be welded to enter the machine or a welded structure to leave the machine, and a lowered position in which the tools of the upper unit 3 engage a structure already positioned on the lower unit 2 in order to carry out the necessary welding operations. One of two transfer bars (only one of which is shown schematically in FIG. 1) is indicated 4 and serves to transport the structures to be welded into the machine and the welded structures out of the machine. Each time the transfer bars bring a new structure to be welded into the machine, the structure is lowered, by any known device, onto the lower unit 2, after which the upper unit 3 is lowered towards the lower unit 2. The latter has a plurality of abutment and locating fixtures 5 which engage corresponding parts of the structure to be welded and position it correctly on the lower unit 2. This unit may also have clamps which engage various portions of the structure to be welded and hold its components together until the welding operation is complete.

The upper unit 3 has a plurality of electrical spot-welding heads 6. Once the structure to be welded has been clamped on the lower unit 2, the upper unit 3 is lowered—as already described—and the welding heads 6 come into operation to execute the necessary spot-welds. Upon completion of the welding, the two units 2, 3 move apart to enable the welded structure to leave the machine.

FIG. 3 shows in section, by way of example, a clamp 5. The clamp 5 shown in FIG. 3 is used in a station for welding together a motor-vehicle body of the type described, for example, in the present Applicant's German patent No. 2,810,822, in the corresponding French patent No. 2,383,818 and the corresponding British patent No. 1,564,669. In theory, however, the clamp shown in FIG. 3 could also be adapted for use in a welding machine of the type illustrated in FIG. 1.

With reference to FIG. 3, a sheet-metal box section, indicated 7, is constituted by three parts 8, 9, 10 which are to be welded together in correspondence with juxtaposed flanges 8a, 9a, 10a and 8b, 9b, 10b. In order to keep the parts in the correct relative positions, the flanges are clamped between two fixed abutments 11, 12 and a movable element 13 with two arms 14, 14' which cooperate with the fixed abutments 11, 12 respectively to clamp the flanges of the sheet-metal parts between them.

The fixed abutment 11 is fixed by screws 15 to an intermediate element 16 which in turn is fixed by screws 17 and locating pins 18 to a support structure 19. Spacer plates 20, 21 are interposed between the element 19 and the element 16 and between the element 16 and the element 11 respectively. The use of plates 20, 21 of different thicknesses enables the position of the abutment 11 to be adjusted. Similarly, the abutment 12 is fixed to the structure 19 by means of screws 22 and a spacer plate 23 whose thickness determines the position of the abutment 12. Also in a similar manner, the closure element 13 is fixed by screws 24 to an intermediate element 25 which is fixed by screws 26 and locating pins 27 to a member 29 articulated at 30 to the structure 19. Respective spacer plates 31, 32 are interposed between the element 13 and the element 25 and between the element 25 and the member 29. The thicknesses of the plates 31, 32 determine the positions of the arms 14, 15 of the clamping element 13.

FIG. 2 of the appended drawings shows schematically and in perspective, by way of example, a plurality of locating fixtures 5 provided on the lower unit 2 of the machine 1 shown in FIG. 1. Each of the locating fixtures 5 shown in FIG. 2 is fixed to a support structure 33, shown purely schematically in FIG. 2, with the interposition of spacer plates (not visible in FIG. 2) or in any other known manner which enables the position of each of the fixtures in space to be adjusted.

Naturally, it is impossible to produce a welded structure of good quality which corresponds to the design configuration if one or more of the fixtures 5 are displaced from their correct positions. According to the prior art, whenever a defect was detected in the welded structures output from the machine 1, the machine had to be stopped and the correct positioning of all the fixtures 5 of the machine checked manually. This operation is lengthy and laborious. Moreover, access to the various fixtures may sometimes be very difficult. The problem is increased when an entire production line using several machines, for example, of the type indicated above, has to be checked.

In order to overcome the problems indicated above, the embodiment of the invention shown in the drawings provides for the use of a coordinate-checking robot which is moved along the production line periodically in order to check that all the fixtures are positioned correctly. The checking robot, generally indicated 34, includes one or more feeler heads 35 (the embodiment illustrated shows only one head) each of which is carried by a support structure 36 (in the embodiment illustrated, this structure is a pallet) by means of any guide structure 37 (in the embodiment illustrated the guide structure has slides slidable along three perpendicular cartesian axes) which enables the feeler head 35 to move so as to follow any path in space.

The robot 34 has electronically-controlled actuator means for controlling the movement of the feeler head 35. The actuator means are not explained in detail in the present description since they may be of any known type and do not fall within the scope of the present invention. Moreover, the elimination of these structural details from the drawings makes the drawings more easily and readily understood. Simply for greater clarity, the actuator means have been indicated schematically by a block 38 associated with the support device of the feeler head 35.

The system used to move the checking robot 34 along the production line or installation and to stop it in correspondence with each machine or station may be of any known type. FIGS. 1 and 2 show, purely by way of example, a pallet 36 connected to two transfer bars 4.

A stationary electronic control unit 39 is located in correspondence with each machine. Each time the coordinate-checking robot 34 is stopped in correspondence with a machine, for example, the machine shown in FIG. 2, the actuator means 38 associated with the robot are connected to the electronic control unit 39 corresponding to that machine. Purely as a theoretical illustration of this step, FIG. 2 shows a connecting cable 40 connected to the actuator means 38 and having a connector 41 for its connection to the control unit 39.

The control unit 39 controls the movements of the feeler head 34 according to a predetermined program adapted to the specific configuration and arrangement of the fixtures 5 of the machine 1. The feeler head 35 is first brought into contact with three perpendicular surfaces 42x, 42y and 42z of a reference element which is taken as the origin of the selected system of coordinates. Once the reference system has been set to zero in this way, the checking head is brought successively into correspondence with the various fixtures. The head is moved so as to travel along the active surface of each fixture so that the correct positioning and attitude of the fixture can be checked. The local control unit 39 includes display means for displaying the results of the checks on a video screen 39a and/or as a print-out 39b.

If the displacement of one or more fixtures from their correct theoretical positions is detected, the extent of the displacement is also displayed so that the error can be corrected quickly.

Upon completion of the check, the actuator means 38 are disconnected from the local control unit 39 and the checking robot is moved in order to check a subsequent station in the production line.

The main advantage of the device according to the invention consists of the fact that it enables a fully automatic check of the fixtures of the production line to be carried out very quickly. This operation can therefore be carried out periodically in order possibly to prevent any defects arising in the products output from the line.

Naturally, the specific conformation of the checking unit may differ from that shown purely by way of example in the appended drawings. The details of construction and forms of embodiment may be varied widely with respect to those described, without thereby departing from the scope of the present invention.

I claim:

1. A method of checking fixtures used in machines of a production installation, wherein said method comprises the following steps:
   a) providing at least one coordinate-checking unit (34) comprising:
      a support structure,
      at least one feeler head carried by the support structure and movable relative thereto so that said feeler head can travel along any path in space, and
      electronically-controlled actuator means carried by the support structure for controlling movement of the feeler head,
   b) providing a separate stationary electronic control unit near each machine, for controlling the actuator means of the coordinate-checking unit in order to move the feeler head according to a predetermined program adapted to a specific arrangement and configuration of the fixtures of each machine,
   c) moving the checking unit along the installation and stopping the checking unit successively in correspondence with the machine whose fixtures are to be checked, at least for a period of time necessary to check the fixtures,
   d) connecting the actuator means of the checking unit to the stationary control unit near each machine after the checking unit has stopped at each specific machine and checking the coordinates of the fixtures according to the corresponding predetermined program,
   e) disconnecting the stationary control unit from the actuator means of the checking unit after the checking has been carried out at a specific machine to enable the checking unit to be moved to the next machine,
   f) displaying the results of the checking by means of the stationary control unit near each machine in order to identify any fixtures which are displaced from their correct positions and to determine the extent of any displacement.

2. A method according to claim 1, wherein after the checking unit has stopped in correspondence with a specific machine and after the actuator means have been connected tot he stationary control unit, the feeler head is brought into correspondence with reference surfaces in order to set to zero a coordinate reference system used by the control unit.

3. A device for checking fixtures used in machines of a production installation, wherein said device comprises:
   a) at least one coordinate-checking unit including a support structure, at least one feeler head carried by the support structure and movable relative thereto so that said feeler head can travel along any path in space, and electronically-controlled actuator means carried by the support structure for controlling the movement of the feeler head;
   b) a separate stationary electronic control unit near each machine of the installation for controlling the actuator means of the coordinate-checking unit in order to move the feeler head according to a predetermined program adapted to a specific arrangement and configuration of the fixtures of each machine,
   c) means for moving the checking unit along the installation and stopping the checking unit successively in correspondence with the machine whose fixtures are to be checked, at least for a period of time necessary to check the fixtures,
   d) means for connecting the actuator means of the checking unit to the stationary control unit near each machine after the checking unit has stopped in correspondence with each specific machine and checking the coordinates of the fixtures to be checked according to a predetermined program and disconnecting the control unit from the activator means after checking has been carried out to enable the checking unit to be moved to the next machine, and
   e) display means forming part of the stationary electronic control unit for displaying the results of the checking in order to identify any fixtures which are displaced form their correct positions and to determine the extent of any displacement.

* * * * *